United States Patent
Sunahara et al.

[11] 3,893,333
[45] July 8, 1975

[54] DEVICE FOR AUTOMATIC DETERMINATION OF SUSPENDED SOLIDS CONTENT IN WATER

[75] Inventors: Hiroshi Sunahara, Seto; Yutaka Ishihara, Anjo; Noboru Nakayama, Nagoya, all of Japan

[73] Assignee: Agency of Industrial Science & Technology, Tokyo, Japan

[22] Filed: Nov. 14, 1973

[21] Appl. No.: 415,799

[30] Foreign Application Priority Data
Nov. 15, 1972 Japan............................ 47-114441

[52] U.S. Cl.................................. 73/61 R; 210/143
[51] Int. Cl. .......................................... G01n 11/02
[58] Field of Search ............ 210/143, 68, 387, 138; 73/61 R, 424, 61.2

[56] References Cited
UNITED STATES PATENTS
| | | | |
|---|---|---|---|
| 3,308,649 | 3/1967 | Colechia............................ | 73/61 R |
| 3,686,925 | 8/1972 | Fleisch et al........................ | 73/61 R |

*Primary Examiner*—Frank A. Spear, Jr.
*Attorney, Agent, or Firm*—Oblon, Fisher, Spivak, McClelland & Maier

[57] ABSTRACT

A device for automatic determination of suspended solids content in water comprises an automatic sample liquid collection unit, an automatic specimen preparation unit, an automatic filter paper feeding unit, an automatic filter paper transfer unit, an automatic suspended solids filtration unit, an automatic drying unit, an automatic weighing and display unit and an automatic process control unit. A sample liquid automatically collected is prepared automatically to produce a test specimen. The specimen is filtered through a sheet of filter paper supplied by the automatic filter paper feeding unit. The filter paper on which the suspended solids of the specimen are deposited in consequence of the filtration is dried by the automatic drying unit and thereafter weighed. The weight thus taken is automatically converted into a corresponding electrical quantity and forwarded to an arithmetic circuit, in which the suspended solids content of the given liquid is calculated and recorded.

9 Claims, 6 Drawing Figures

DEVICE FOR AUTOMATIC DETERMINATION OF SUSPENDED SOLIDS CONTENT IN WATER

BACKGROUND OF THE INVENTION

This invention relates to a device for automatic, continuous determination and recording of data on the suspended solids content of water which data is an important factor in the evaluation of the quality of various kinds of water, such as the natural water of rivers, seas and lakes, so-called environmental water, industrial water, industrial effluents, raw water for water supply, city water, sewage, irrigation water, etc.

Tolerable concentrations of solids suspended in various kinds of water are specified in the Environmental Water Quality Standards and the Law concerning Prevention of Water Pollution in Japan, for example. In this connection, determination of the suspended solids content in water proves to be extremely important for test of water pollution. With respect to the method of determination, therefore, is important that the determination be free from possibility of human error and that it be effected automatically and continuously.

A method for the determination of solids suspended in water is set forth in the Japanese Industrial Standards titled "Method for Testing Plant Effluents (JIS KO102-1971)" and "Method for Testing Industrial Water (JIS KO101-1966)" both published by the Japanese Industrial Standards Association. In the texts of said standards, matter separated by filtration or by centrifugation from the water under investigation is defined as suspended solid.

According to this method, filter paper No. 6 (standard type for quantitative analysis) to be used is weighed. Then, a predetermined volume of specimen water is passed through the filter paper to collect thereon inorganic and organic suspended solids separated from the specimen. The filter paper having the separated suspended solids deposited thereon is dried at 110°C for 2 hours and then weighed. The suspended solids content of the water is calculated in accordance with the following equation:

$$S = (a - b) \times 1,000/V$$

wherein, $S$ stands for amount of suspended solids (in ppm), $a$ for weight of filter paper (in mg) prior to filtration, $b$ for weight of filter paper (in mg) after filtration and $V$ for volume of specimen water (in ml).

Heretofore, the suspended solids content of a given water has been manually determined by following the procedure described above. This manual procedure is complicated and requires a minimum of more than three hours for each determination and inevitably involves the possibility of human error.

As to the automatic and continuous determination of suspended solids content, there have heretofore been suggested methods which utilize the phenomena of turbidity of liquid and absorption of ultrasonic waves. According to these methods, however, accurate values of determination are not obtained because the determination is affected by the composition of the suspended solids, size of the suspended particles, presence of bubbles, etc. Even when the suspended solids are of the same kind, the determined valve may vary because of differences in the properties of the liquid. Thus, the conventional methods for continuous and automatic determination have been found impracticable.

A primary object of this invention is to provide a device for automatically determining the suspended solids content of a given water with high accuracy and speed.

Another object of this invention is to provide a device for automatic determination of the suspended solids content of a given water without possibility of human error.

SUMMARY OF THE INVENTION

To accomplish the aforementioned objects, the device for the automatic determination of the suspended solids content of water according to this invention comprises an automatic sample liquid collection unit, an automatic pecimen preparation unit, an automatic filter paper feeding unit, an automatic filter paper transfer unit, an automatic suspended solids filtration unit, an automatic drying unit, an automatic weighing and display unit and an automatic process control unit. A sample liquid automatically collected is prepared automatically into a specimen liquid and the specimen is automatically passed through a sheet of filter paper supplied by the automatic filter paper feeding unit. The filter paper on which suspended solids separated from the specimen have been deposited in consequence of the passage of the specimen through the filter paper is automatically dried by the automatic drying unit. The dried filter paper is weighed and its weight is converted into an electric quantity which is forwarded to an arithmetic circuit in which the suspended solids content is calculated from the electric quantity. The solids content thus determined is registered on an automatic recorder. The filter paper on which the whole process of determination has been completed is automatically removed and, at the same time, a new sheet of filter paper is received to repeat the determination on the next sample liquid. All these steps of operation are carried out by having relevant mechanisms automatically acutated by means of the timer of the automatic process control unit. Thus, the determination can be performed accurately and rapidly. Further, absence of manual operation serves to eliminate human error and ensures perfectly reliable determination.

Other objects and other characteristics of this invention will become apparent from the further disclosure of the invention to be given hereinafter with reference to the accompanying drawings.

DETAILED DESCRIPTION OF THE INVENTION

The device for the automatic determination of suspended solids content of water according to this invention comprises an automatic sample liquid collection unit, an automatic specimen preparation unit, an automatic filter paper feeding unit, an automatic filter paper transfer unit, an automatic suspended solids filtration unit, an automatic drying unit, an automatic weighing and display unit and an automatic process control unit.

Figure 1:
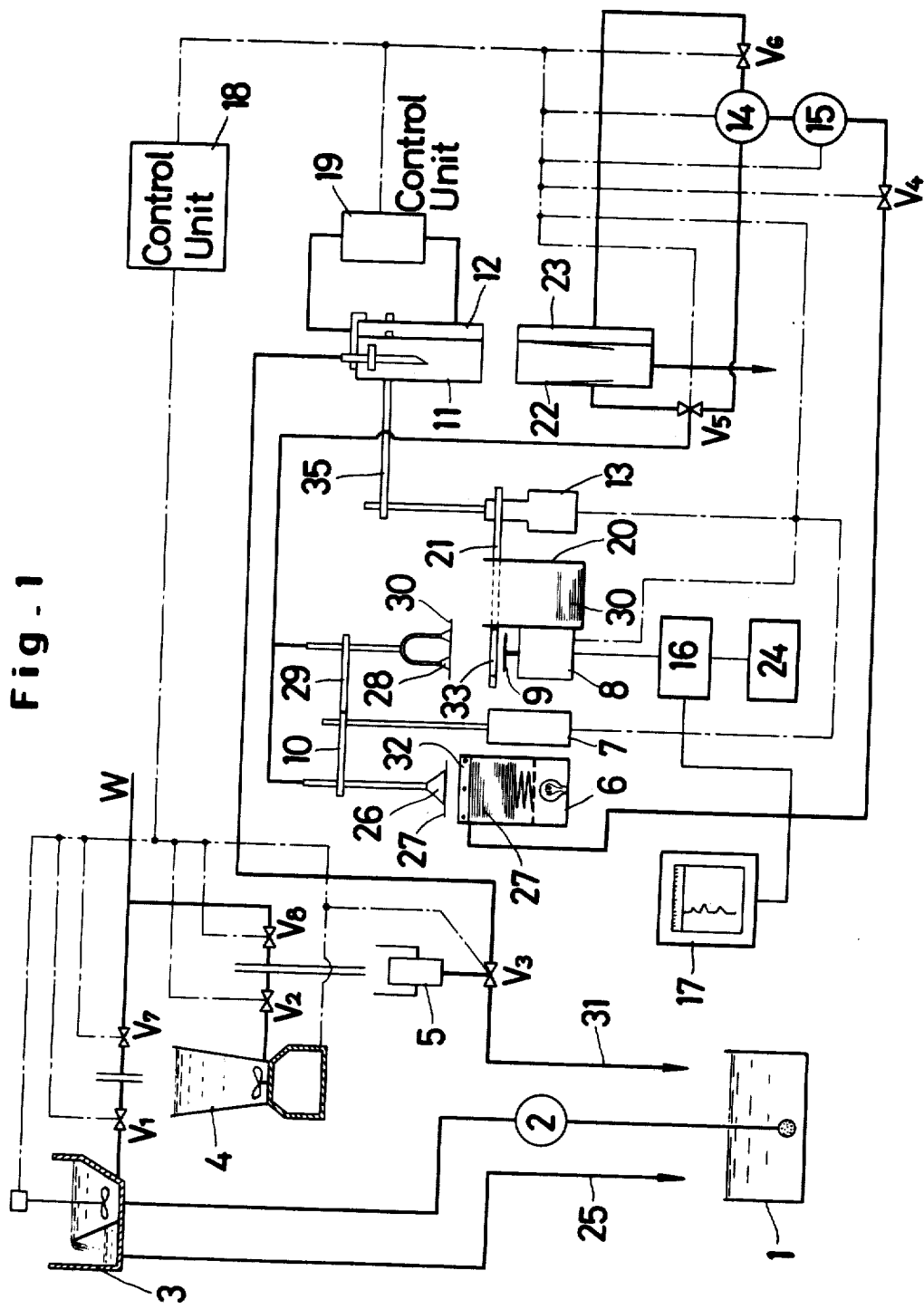
FIG. 1 is a schematic side view illustrating one preferred embodiment of the device for automatic determination of suspended solids content of water according to the present invention.

Referring to FIG. 1, the automatic sample liquid collection unit is composed of a sample reservoir 1, a pump 2 and a collection tank 3 which is provided with a stirrer. The sample liquid in the sample reservoir 1 is forwarded by the pump 2 to the collection tank 3 provided with the stirrer, with the overflowing sample liquid discharged through a pipe 25, so that the collection tank is always filled with fresh sample liquid. The automatic specimen preparation unit is composed of a high-speed mixer 4 and a metering tube 5. A solenoid valve $V_1$ annexed to the collection tank 3 introduces a predetermined volume of sample liquid into the high-speed mixer 4. The sample liquid received is stirred in the mixer 4 and forwarded via a solenoid valve $V_2$ to the metering tube 5. This automatic specimen preparation unit serves the purpose of reducing to a fixed size the coarse suspended solids contained in the sample liquid.

The automatic filter paper feeding unit is composed of a filter paper container 6, a sucker 26, an arm 10 for supporting said sucker 26 and a rotary and vertical drive unit 7 adapted to impart clockwise revolution and vertical motion to said sucker. In the filter paper container 6 adapted to give preliminary drying to the filter paper 27, the filter paper 27 is stored and kept dry by constant heating at 70° – 80°C. By the medium of the valve $V_5$, a suction pump 14 and the drive unit 7 are actuated and, as a consequence, the arm 10 supporting the sucker 26 and interconnected to the drive unit 7 is caused to descend onto the stack of filter paper, enabling the sucker 26 disposed at the forward end thereof to draw up one sheet of filter paper 27. At this time, in order to prevent the sucker from drawing up more than one sheet of filter paper at once, there is incorporated a preventive unit 32 wherein the air supplied via the valve $V_4$ through a discharge pump 15 is blown through discharge orifices against the periphery of the filter paper drawn up against the sucker 26 so that the force of the current of air causes extra sheets of filter paper entrained by the uppermost sheet to be blown down, leaving only one uppermost sheet held fast against the sucking disk of the sucker 26.

The automatic filter paper transfer unit is composed of a vertical and rotary drive unit 13 adapted to produce a vertical motion and an intermittent counterclockwise rotation and a turntable 21 connected to said unit 13. By means of said drive unit 7 of the automatic filter paper feeding unit, the filter paper 27 drawn against the filter paper sucker 26 is carried and released to alight on the turntable 21. Then by means of the vertical and rotary drive unit 13, the filter paper is transferred to the weighing plate, the automatic filtration unit and the automatic drying unit in the order mentioned. This turntable 21 is provided at the forward end thereof with a hole 33 the diameter of which is smaller than that of the filter paper 27 and larger than any of the diameters of the weighing plate 9, the filtration cylinders 11 and 22 and the drying cylinders 12 and 23. The filter paper 27 is placed over this hole 33. During the steps of weighing, filtration and drying, the turntable 21 is caused to descend by means of the vertical and rotary drive unit 13 so that the filter paper will be positioned directly on the weighing plate 9, the opening of the filtration cylinder 22 and the opening of the drying cylinder 23 respectively.

Figure 2:
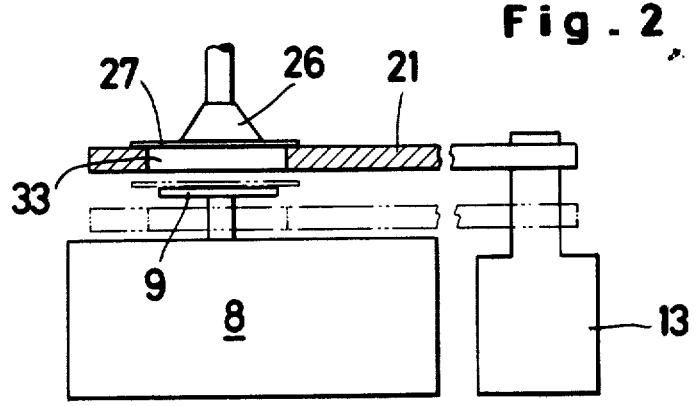
FIG. 2 is an enlarged view of a portion of the device illustrated in FIG. 1.
Figure 3:
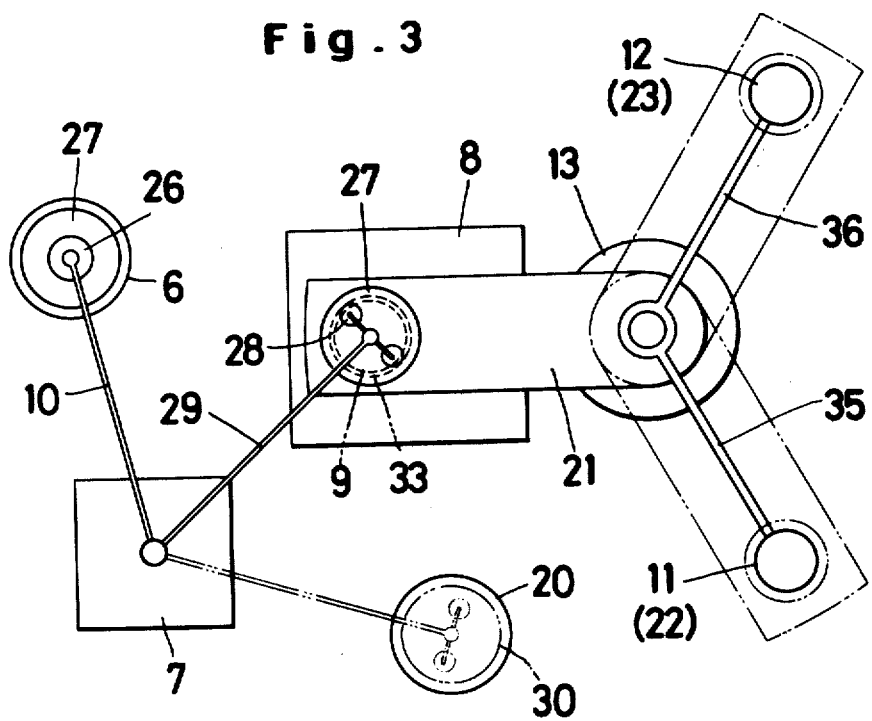
FIG. 3 is a plan view of the device illustrated in FIG. 1.

By means of the drive unit 13, the turntable 21 holding the filter paper 27 thereon is rotated until the paper 27 comes to a point directly above the weighing plate 9. Then, the turntable 21 is lowered so as to place the filter paper 27 on the weighing plate to be weighed by the balance 8 (FIG. 2). The weight of the filter paper thus measured by the balance is converted into an electrical quantity. The filter paper 27 which has gone through the step of weighing is lifted as the turntable 21 is moved upwardly by the vertical and rotary drive unit 13. Thereafter, the turntable 21 is revolved 120 degrees counterclockwise to transfer the filter paper onto the automatic filtration unit (FIG. 3).

Figure 4:
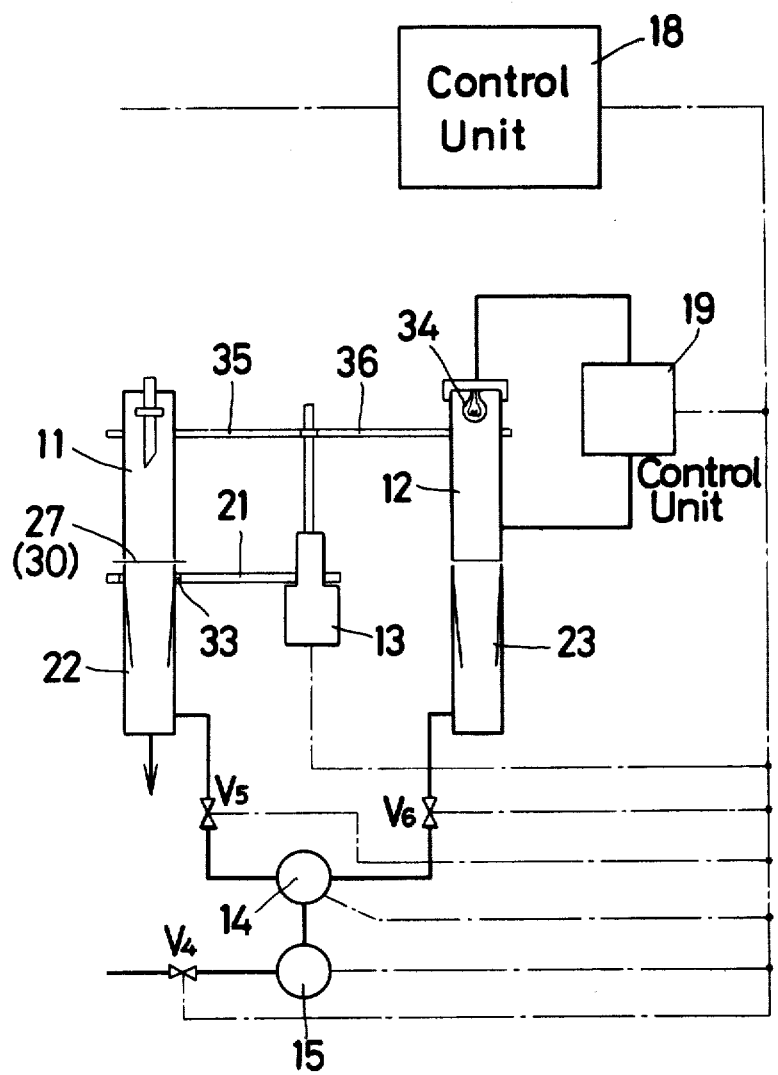
FIG. 4 is a right side view of the device illustrated in FIG. 1.

The automatic filtration unit is, as illustrated in FIG. 4, composed of a pair of filtration cylinders, i.e., an upper filtration cylinder 11 and a lower filtration cylinder 22. The upper filtration cylinder 11 is driven vertically by the drive unit 13 through an arm 35 supporting said cylinder 11.

As soon as the filter paper 27 from the automatic filter paper transfer unit is positioned directly above the lower filtration cylinder 22, the upper filtration cylinder 11 is started down by the vertical and rotary drive unit 13 to sandwich the filter paper between the pair of filtration cylinders 11 and 12 and the suction pump 14 is actuated to open the solenoid valve $V_5$ and reduce the inner pressure of the lower filtration cylinder 22. Then, the solenoid valve $V_3$ annexed to the metering tube 5 is opened to pour the specimen liquid into the upper filtration cylinder 11, with the result that suspended solids in the specimen are collected on the filter paper 27. The specimen liquid which remains after separation of the suspended solids passes into the lower filtration cylinder 22. At this time, the solenoid valve $V_8$ is opened to admit city water W via the metering tube 5 into the upper filtration cylinder 11 so that all the suspended solids adhering to the side walls of metering tube 5 and upper filtration cylinder 11 are washed down and collected on the filter paper 27. The duration of this filtration operation is freely selected by the timer. Even after the whole operation of this filtration has been completed, part of the suspended solids from the specimen liquid still remain adhering to the wall and the bottom of the high-speed mixer. In preparation for the introduction of the next batch of specimen liquid, the solenoid valve $V_7$ is opened to introduce water into the mixer 4 and the mixer is set to motion so as to wash the mixer interior. Then, the solenoid valve $V_2$ is opened to discharge the resultant washings through the metering tube 5, the solenoid valve $V_3$ and the pipe 31.

The automatic drying unit is composed of a pair of upper and lower drying cylinders 12 and 23 connected to the vertical drive element of the vertical and rotary drive unit 13 and an automatic AC voltage control unit 19. When the operation of filtration is completed within said automatic filtration unit, the upper filtration cylinder 11 is put into upward motion by the vertical and rotary drive unit 13 and, at the same time, the turntable 21 starts lifting up the solids bearing filter paper 30 resting on the opening of the lower filtration cylinder 22 and rotates it 120 degrees counter-clockwise for the filter paper 30 to reach the top of the lower drying cylinder 23. The upper drying cylinder 12 is started down by the vertical and rotary drive unit 13 through an arm 36 to sandwich filter paper 27 between the upper and lower drying cylinders 12 and 23 so that the filter paper is dried by means of a heating bulb 34 disposed at the upper portion of the drying cylinder 12. At the same time, the suction pump 14 is actuated to open the solenoid valve $V_6$ and effect quick dehydration of the filter paper 30. The upper drying cylinder 12 is provided with an automatic AC voltage control unit 19 for regulating the potential applied to the heating bulb 34 so as to provide the required drying at 110°C. The length of drying time can be freely selected in the range of 0 to 60 minutes by means of a timer.

The automatic weighing and display unit is composed of a balance 8, an electronic arithmetic circuit 16, an automatic recorder 17 and a digital voltmeter 24. When the drying operation is completed in said automatic drying unit, the vertical and rotary drive unit 13 causes the upper drying cylinder 12 to move up. At the same time, the turntable 21 starts lifting up the filter paper 30 placed on the opening of the lower drying cylinder 23 and revolves it 120° counterclockwise. At this time, the vertical and rotary drive unit 13 lowers the turntable to place the filter paper 30 on the weighing plate 9. The filter paper 30 is weighed by the balance 8 and the weight thus taken is converted into a corresponding electrical quantity. The electronic arithmetic circuit 16 performs a subtraction to find the difference between this weight and the weight of the filter paper taken prior to the filtration, so that the weight of the solids deposited on the filter paper is recorded on the automatic recorder 17 in terms of magnitude of voltage. Thus, in the automatic weighing and display unit, the filter paper 27 preparatorily dried is weighed by the balance 8 prior to the filtration and the weight so taken is converted into an electrical quantity and then memorized by the potential difference circuit system. Let $A$ (mg) stand for this weight. Let $B$ (mg) stand for the weight of the same filter paper measured after the automatic filtration and the automatic drying. These weights are converted into respective electrical quantities which are processed by the electronic arithmetic circuit 16. The quantity of suspended solids contained in the specimen liquid is calculated in accordance with the following equation.

$$S = (B - A) \times 1000/V$$

wherein, $S$ is the concentration (in ppm) of the suspended solids and $V$ is the metered volume (in ml) of the specimen liquid.

The value of $S$ thus determined is converted into an electrical quantity and recorded in the automatic recorder 17 and further displayed on the digital voltmeter 24.

When the recording of the weight of the suspended solids is completed as described above, the vertical and rotary drive unit 13 starts lifting up the turntable 21 to raise the filter paper 30 from the weighing plate 9. Then, the suction pump 14, the discharge pump 15 and the vertical and rotary drive unit 7 are set to motion to cause the sucker 26 to draw up a fresh sheet of filter paper from the stack stored in the filter paper container 6 and to cause the sucker 28 to pick up the used sheet of filter paper now resting on the turntable 21. At this time, the vertical and rotary drive unit 7 is actuated to cause the arms 10 and 29 supporting the suckers 26 and 28 respectively which are now holding the fresh sheet and the used sheet of filter paper to be rotated clockwise to bring the fresh sheet of filter paper 27 directly above the turntable 21 and the used sheet 30 above the used filter paper receptacle 20. At this time, the suction pump 14 is stopped and, consequently, the fresh sheet of filter paper 27 falls and alights on the turntable 21 and the used sheet 30 falls into the used filter paper receptacle 20.

The various operating mechanisms described above are automatically controlled by the timer of the automatic process control unit 18 so as to provide continuous or intermittent operation as required.

The interrelation between the automatic filter paper feeding unit and the automatic filter paper transfer unit and the arrangement of said units in the present invention will be described hereinbelow.

Referring to FIG. 1 and FIG. 3, the filter paper sucker 26 serving to draw up a fresh sheet of filter paper 27 supplied from the automatic filter paper feeding unit and the sucker 28 serving to draw up the used sheet of filter paper 30 which is resting on the turntable 21 are connected through their respective arms 10 and 29 to the vertical and rotary drive unit 7 designed to impart a vertical motion and a clockwise rotation to said suckers. The sucker 26 is positioned directly above the filter paper container 6 so as to draw up a fresh sheet of filter paper 27 from the stack held in said filter paper container 6 and the filter paper sucker 28 is brought to a position directly above the turntable 21 so as to pick up the used sheet of filter paper 30 which rests on the turntable 21. With the suckers in said positions, the arms 10 and 29 which are connected to the vertical and rotary drive unit 7 are simultaneously lowered for the former sucker to draw up a fresh sheet and the latter sucker the used sheet. With the sheets of filter paper adhering to the respective suckers, the arms are lifted and revolved so that the former sucker moves from above the filter paper container 6 and stops above the turntable 21 disposed on the weighing plate 9 and, at the same time, the latter sucker moves from above the turntable 21 disposed on the weighing plate 9 and stops above the used filter paper receptacle 20. At this time, the suction pump 14 is stopped and, consequently, the fresh sheet of filter paper 27 falls to rest on the turntable 21 and the used sheet of filter paper 30 falls gently to be received in the used filter paper receptacle 20. As the fresh sheet of filter paper 27 falls into position on the turntable 21, the vertical and rotary drive unit 13 starts lowering the turntable 21. As the turntable 21 goes down, the weighing plate 9 enters the hole 3 formed at the forward end of the turntable. As the turntable continues its downward travel further, the weighing plate 9 automatically lifts the filter paper off the turntable 21 and measures the weight of the filter paper. When this weighing is completed, the vertical and rotary drive unit 13 raises and then rotates the turntable 21 to transfer the filter paper first to the opening of the filtration cylinder 22 positioned at the automatic filtration unit and then to the opening of the drying cylinder 23 at the automatic drying unit. The operations of weighing, filtration and drying can smoothly be performed automatically and continuously by having the weighing plate 9, the filtration cylinders 11 and 22 and the drying cylinders 12 and 23 disposed properly around the shaft of the turntable 21 attached to the vertical and rotary drive unit 13.

Determination of the suspended solids content of water is one of the essential factors for the evaluation of water quality in connection with control of environmental waters and prevention of water pollution, with preservation of environment as the eventual goal. The control of environmental waters and that of industrial effluents and sewage which tend to polute environmental waters are such that any device designed to test such waters for suspended solids content fails to lend itself to effective control unless the device provides automatic, continuous operation with high accuracy and speed and ensures reduction of labor.

With the device for the automatic determination of the suspended solids content in water according to the present invention, one cycle of determination requires only short time, e.g., 30 to 35 minutes in the case of environmental water such as river water or lake water, about 30 to 40 minutes in the case of industrial effluent sampled for control of discharge and 40 to 60 minutes in the case of sewage. Further, since the determination is carried out automatically, and not manually, in conformity to the method for testing industrial effluents specified by Japanese Industrial Standards, the operation of this device enjoys high accuracy and economy of labor. Moreover, since the device is operated by an automatic and continuous method, countermeasures, if required for the control of the water quality, can be taken with minimum waste of time. It is, therefore, believed that the device will make a truly great contribution to the preservation of environment.

The method according to the present invention will be described in further detail herein below with reference to working examples. It should be understood that this invention is not limited to these examples.

EXAMPLE 1

Kaolin (made by Fisher Scientific Inc. of the U.S.) which had undergone an addifying treatment was used as a suspended solid in water. Aqueous solutions containing varying concentrations, 0 – 1600 ppm, of kaolin were prepared and tested by using filter paper No. 6. The container for new sheets of filter paper was kept dry by heating the interior thereof at 75°C with an electric bulb, AC 100 V and 60 W. Samples, each 200 ml in volume, were taken from the solutions. The filtration was performed, with the duration fixed at 10 minutes and the reduced pressure during the initial period of filtration fixed at 5 to 7 mmHg. The filter paper wetted in consequence of the filtration was subjected to accelerated drying under a reduced pressure for 15 minutes at 110°C by use of an electric bulb, AC 100 V and 250 W. The series of automatic specimen preparation, automatic filter paper feeding, automatic filter paper transfer and automatic filter paper weighing operations was performed by the stepping programming method over a combined period of 8 minutes. The total length of time required for one complete cycle of determination terminating in the registration of the weight of suspended solids was 33 minutes.

Figure 5:
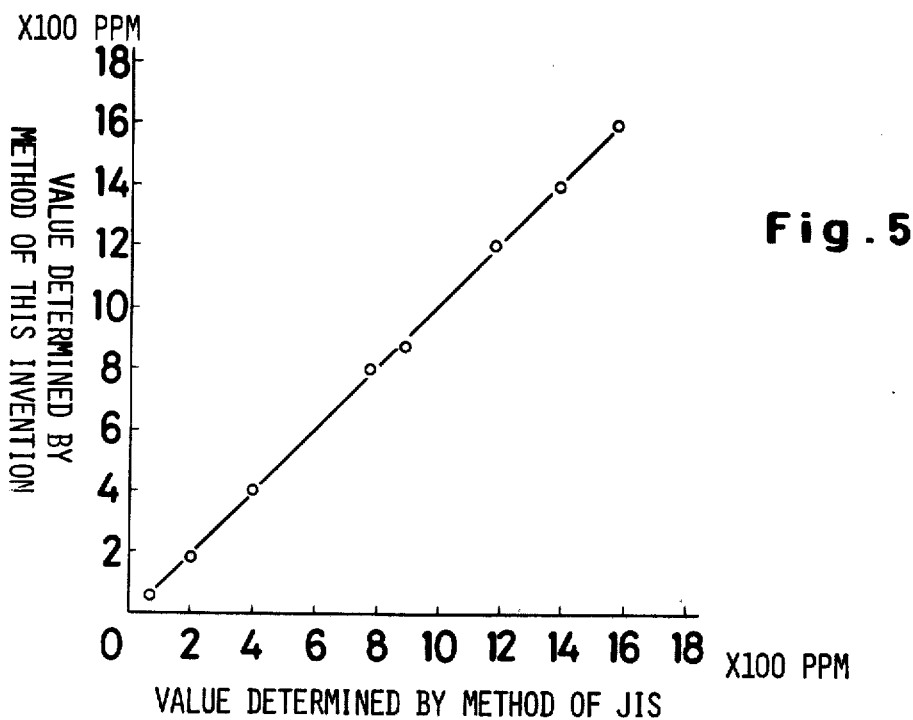
FIG. 5 is a graph showing the values obtained of specimens containing kaolin as an inorganic suspended solid by the device according to this invention in comparison with the values obtained for the same specimens by the method conforming to Japanese Industrial Standards.

The results obtained for said specimen liquids by the device according to this invention are compared in FIG. 5 with the results obtained for the same specimen liquids by the manual method for determination of industrial effluent specified by Japanese Industrial Standards. A review of the graph indicates that the two sets of results are in satisfactory agreement with each other. The determination by the method according to this invention is shown to be accurate to within ±2.4% with respect to the specimen liquid containing 300 ppm of Kaolin, with the limit of detection at 5 ppm.

EXAMPLE 2

Activated sludge was used as an organic suspended solid in water. Aqueous solutions containing varying concentrations of activated sludge were tested by use of filter paper No. 6 similarly to Example 1. Samples, each 200 ml in volume, were taken from the solutions. The filtration was performed, with the duration fixed at 15 minutes and the reduced pressure during the initial period of filtration fixed at 2 to 3 mmHg. The filter paper wetted from the filtration was subjected to drying at 110°C for 15 minutes. The total time required for one complete cycle of determination was 38 minutes.

Figure 6:
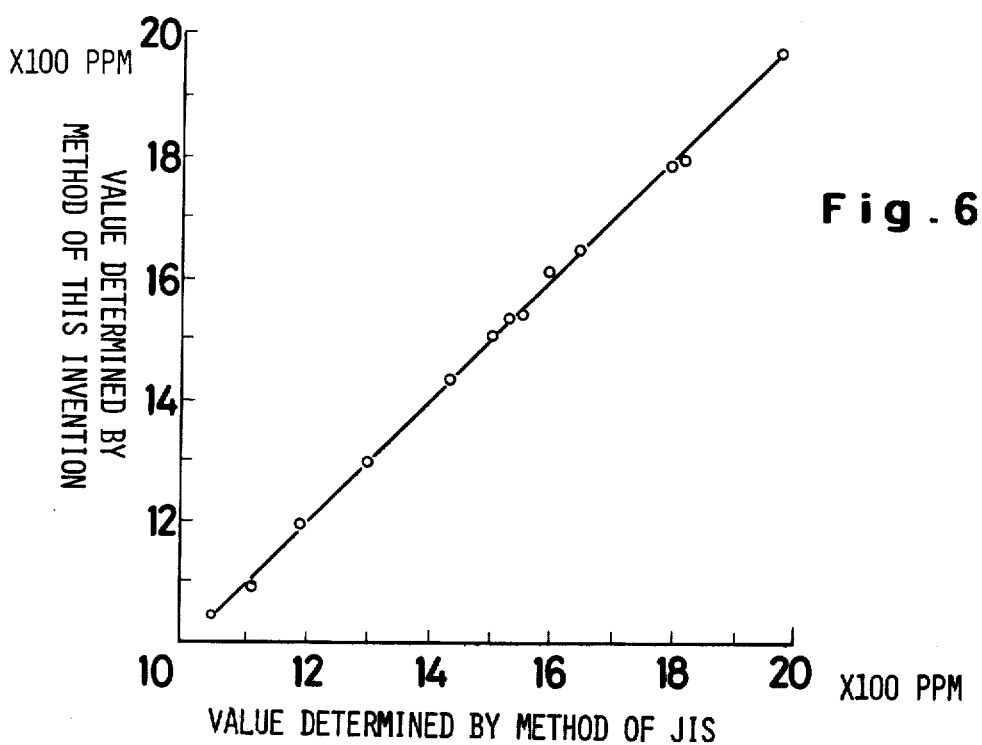
FIG. 6 is a graph showing the values obtained of specimens containing activated sludge as an organic suspended solid by the device according to this invention in comparison with the values obtained of the same specimens by the method conforming to Japanese Industrial Standards.

The results obtained for said specimen liquids by the device according to the present invention are compared in FIG. 6 with the results obtained for the same specimen liquids by the manual method for determination of industrial effluent specified by Japanese Industrial Standards. A review of the graph indicates that the two sets of results are in satisfactory agreement with each other. The determination of the content of activated sludge by the method according to this invention is shown to be accurate to within ±8% with respect to the specimen liquid containing 1650 ppm of activated sludge, with the limit of detection at 7 ppm.

EXAMPLE 3

As an actual material difficult of filtration, a sewage collected at a sewage disposal was subjected to the automatic determination of suspended solids. This was not the untreated city sewage as received at the inlet to the sewage disposal but was the sewage which had been passed through screens for removal of coarse refuse matter and was on the way to the sedimentation pond. Samples, each 100 ml in volume, were filtered by using the same filter paper No. 6 as used in Example 1. The filtration was performed, with the duration fixed at 15 minutes and the reduced pressure during the initial stage period of filtration fixed at 1 – 2 mmHg. The filter paper wetted from the filtration was subjected to drying at 110°C for 15 minutes. The total time required for one complete cycle of determination was 38 minutes.

The results obtained of said specimen liquids from sewage by the device according to this invention are compared in Table 1 below with the results obtained of the same specimen liquid by the method for determination of industrial effluent specified by Japanese Industrial Standards. A review of the data indicates that the two sets of results are in satisfactory agreement and within ±10% of each other.

Table 1

| Cycle of determination | Value of content (ppm) determined by the method of this invention | Value of content (ppm) determined by the method of JIS K-0102-1971 |
| --- | --- | --- |
| 1 | 120 | 108 |
| 2 | 117 | 121 |
| 3 | 114 | 102 |

Table 1-Continued

| Cycle of determination | Value of content (ppm) determined by the method of this invention | Value of content (ppm) determined by the method of JIS K-0102-1971 |
| --- | --- | --- |
| 4 | 120 | 110 |
| 5 | 115 | 104 |
| Average | 117.2 | 108.1 |

What is claimed is:

1. A device for the determination of suspended solids content in water, comprising in combination:
   a sample liquid collection means adapted to collect a sample liquid continuously,
   a specimen liquid preparation means adapted to agitate the collected sample liquid and meter out a predetermined amount of the prepared specimen liquid;
   a filter paper feeding means adapted to take out individual sheets of filter paper one by one and deliver the sheet of filter paper onto a turntable disposed over a weighing plate,
   a filter paper weighing means serving to weigh the filter paper placed on the turntable and register the weight thereof,
   a specimen liquid filtration means adapted to deliver the predetermined amount of specimen liquid received from the specimen liquid preparation means onto the filter paper of known weight and cause suspended solids to be separated from the specimen liquid in consequence of filtration through the filter paper,
   a drying means for drying the filter paper on which the suspended solids separated from the liquid are deposited,
   a determination display means adapted to transfer the dried filter paper to be weighed onto said filter paper weighing means and display and record the difference between the weight of filter paper prior to filtration and the weight thereof after filtration,
   a means for removing the used filter paper, and
   automatic process control means for operating automatically and continuously said sample liquid collection means, said specimen liquid preparation means, said filter paper feeding means, said filter paper weighing means, said specimen liquid filtration means, said drying means, said determination display means and said means for removing the used filter paper, whereby said suspended solid content is automatically and continuously determined and recorded.

2. A device for the determination of suspended solids in water according to claim 1, wherein the filter paper feeding means is provided at the forward end of an arm thereof with a sucker for attracting a sheet of filter paper by virtue of vacuum produced by a suction pump and is adapted to deliver the attracted filter paper onto the turntable by the revolution of said arm.

3. A device for the determination of suspended solids in water according to claim 2, wherein the turntable is provided at the forward end thereof with a circular hole smaller than the filter paper and larger than the weighing plate and is adapted to receive the delivered filter paper concentrically on said hole.

4. A device for the determination of suspended solids in water according to claim 3, wherein the turntable on which the filter paper is placed is lowered so as to have the filter paper transferred to assume a position for weighing on the weighing plate.

5. A device for the determination of suspended solids in water according to claim 3, wherein the hole formed at the forward end of the turntable has a diameter larger than any of the diameters of the filtration cylinders and drying cylinders and the weighing plate, the filtration cylinders and the drying cylinders are concentrically positioned with respect to the hole on the circumferential edge of the turntable.

6. A device for the determination of suspended solids in water according to claim 1, wherein the specimen liquid filtration means comprises an upper filtration cylinder and a lower filtration cylinder so that the filter paper of the known weight is delivered and placed to intervene between the upper and lower filtration cylinders and the specimen liquid is supplied down the upper filtration cylinder onto the filter paper while the lower filtration cylinder is maintained under a reduced pressure.

7. A device for the determination of suspended solid in water according to claim 1, wherein the drying means comprises an upper drying cylinder fitted with a heating means and a lower drying cylinder so that the filter paper on which separated suspended solids are deposited is delivered and placed to intervene between the upper and lower drying cylinders and it is dried by the heat emanating from the heating means of the upper drying cylinder while the lower drying cylinder is maintained under a reduced pressure.

8. A device for the determination of suspended solids in water according to claim 1, wherein the means for removing the used filter paper is provided at the forward end of an arm thereof with a sucker for attracting the used sheet of filter paper by virtue of vacuum produced by a suction pump and is adapted to remove the attached filter paper from the turntable by the revolution of said arm.

9. A device for the determination of suspended solids in water according to claim 1, wherein the arm for the filter paper feeding means and the arm for the means for removal of used filter paper are disposed at a fixed angle from each other, the suckers disposed at the forward ends of said arms simultaneously attract the different sheets of filter paper, and said arms are revolved, while keeping said fixed angle from each other, so as to remove the used sheet of filter paper from the turntable and at the same time deliver a fresh sheet of filter paper onto said turntable.

* * * * *